Dec. 2, 1969  G. N. H. COOKE ET AL  3,481,545
METHOD AND APPARATUS FOR INDICATING THE EXTENT OF
LAND SUBJECTED TO AN AGRICULTURAL OPERATION
Filed Dec. 26, 1967  4 Sheets-Sheet 1

Dec. 2, 1969 G. N. H. COOKE ET AL 3,481,545
METHOD AND APPARATUS FOR INDICATING THE EXTENT OF
LAND SUBJECTED TO AN AGRICULTURAL OPERATION
Filed Dec. 26, 1967 4 Sheets-Sheet 4

Inventors:
Gordon Noel Hardyman Cooke
Henry Patrick Hall
and
John Christopher Lister Lister-Kaye
by Baldwin Wight Diller & Brown
Attorneys United States Patent Office 3,481,545
Patented Dec. 2, 1969

3,481,545
METHOD AND APPARATUS FOR INDICATING THE EXTENT OF LAND SUBJECTED TO AN AGRICULTURAL OPERATION
Gordon Noel Hardyman Cooke, Painswick, Henry Patrick Hall, Chippenham, John Christopher Lister Lister-Kaye, Bath, Somerset, England, assignors to Soil Fertility Limited, Hartham, Corsham, Wiltshire, England, a corporation of the United Kingdom
Filed Dec. 26, 1967, Ser. No. 693,577
Int. Cl. A01c 23/04
U.S. Cl. 239—172                                6 Claims

ABSTRACT OF THE DISCLOSURE

Part marking in agricultural operation such as spraying is achieved by depositing from a vehicle along its path a continuous or discontinuous line of foam. A foam generator is provided on the vehicle comprising a reservoir of foamable liquid and a source of pressurised gas, together with means for mixing the liquid and gas and depositing the resultant foam in a desired relation to the vehicle. The source of gas may be the exhaust of the vehicle engine which is introduced into the liquid in the reservoir. Foam discharge orifices having terminal pipes of enlarged diameter achieve intermittency in foam deposit.

---

Figure 1:
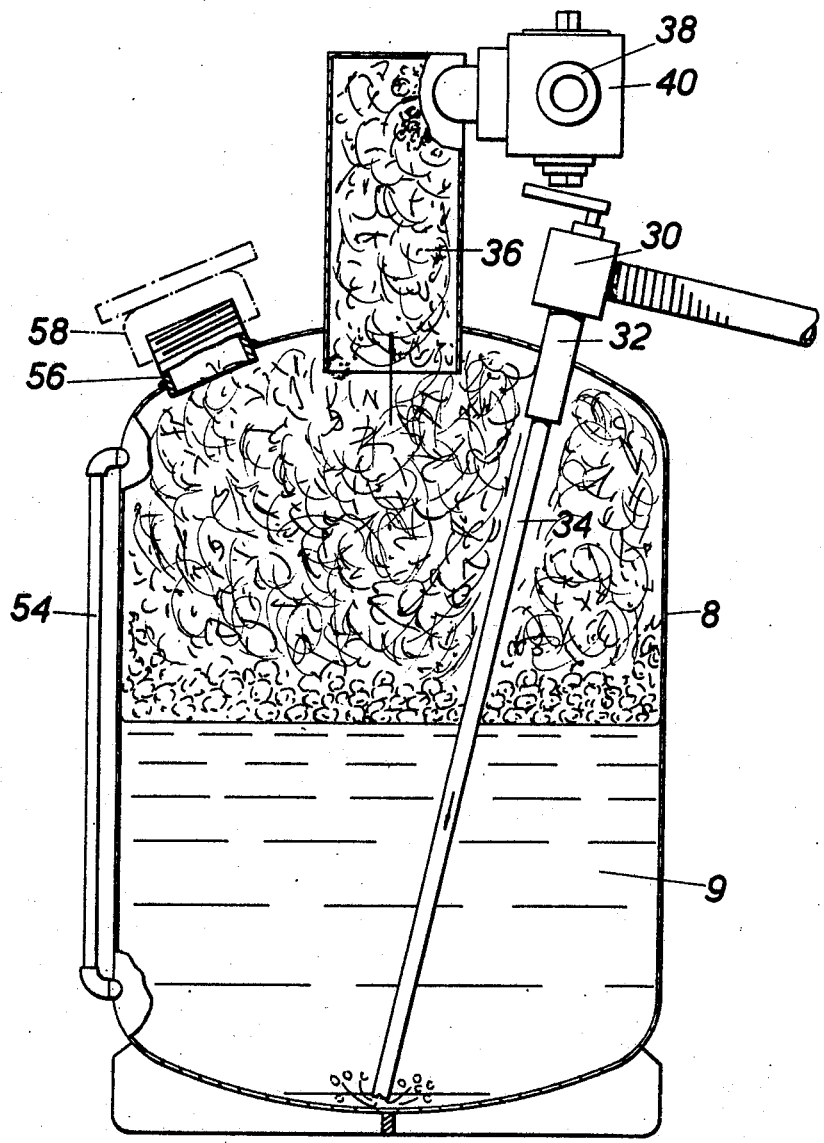

This invention relates to a method and apparatus for facilitating the determination by an operator of the extent of an area of land which has already been subjected to an agricultural operation, such as the spraying or spreading of agricultural chemicals for example solid or liquid weed killers, insecticides, fungicides or fertilisers, so as to define the area covered by a previous run of a vehicle engaged in field spraying or spreading of liquid or solid chemicals or any other agricultural or horticultural operation where the treated portion of the land being treated is not sufficiently clearly visible or defined.

For many years there has been a great demand for a means of clearly defining the boundary of the already treated portion of land subjected to such an agricultural operation, since in the absence of such means various faults arise, such as:

(1) The operator driving wide, resulting in missed strips between "bouts."

(2) Excessive overlapping, resulting for example in the case of spraying in irregular application with consequent waste of chemical and possible damage to crops.

(3) Slowing up of operation due to the operator endeavouring to detect the boundary of his previous bout.

The object of the present invention is to overcome these deficiencies by providing means of clearly defining the extent of the bout.

The invention is equally applicable to and useful for facilitating the application of solid or liquid agricultural chemicals or materials, particularly when material is sprayed or broadcast, or for any agricultural operation where the previous path of the vehicle or machine used and/or the extent of the previously treated area of land is difficult or impossible to ascertain visually.

During development of the previous invention we evolved a method in which at least one lateral boundary of a bout sprayed by a vehicle equipped with a spray boom or spreading mechanism is defined by releasing at regular intervals at said lateral boundary of the bout a dash of dye solution of an agriculturally unobjectionable nature. We have found however that when dye is used, this is not always as readily visible at it might be, and furthermore the quantity which has to be used requires relatively frequent refilling of the apparatus thus reducing the productivity of the operator. We have now found that foam is much more satisfactory for the present purpose, since it is very readily visible, it lasts long enough to fulfill its marking purpose during the progress of an agricultural operation but nevertheless disperses relatively rapidly so as not to cause a permanent disfigurement, and it is economical in terms of the bulk of the materials used to produce the foam. An especial object of the present invention is to provide apparatus which is adapted for marking the lateral boundary of a bout treated by a vehicle or agricultural machine with foam.

According to the invention, a method of indicating the lateral boundary of a bout treated by an agricultural vehicle comprises generating an agriculturally unobjectionable foam and discharging it continuously or intermittently in at least one line parallel to the direction of motion of the vehicle whereby to provide a guide line for positioning the vehicle during an adjacent bout or a subsequent operation.

According to a further feature of the invention, apparatus for defining the boundary of a bout treated by an agricultural vehicle comprises at least one discharge orifice adapted to be carried by the vehicle or machine and located so as to discharge onto the ground, a reservoir containing a foamable liquid of an agriculturally unobjectionable nature, a source of compressed gas, means to admix the gas and the liquid to form a foam, and a tube to conduct said foam to said discharge orifice.

The last part of the pipe or pipes to the discharge orifice or orifices may be of enlarged cross section so as to act as a collecting vessel from which intermittent but relatively large deposits of foam are ejected onto the ground, or alternatively may be of smaller cross section in which case a more continuous discharge is obtained.

Figure 2:
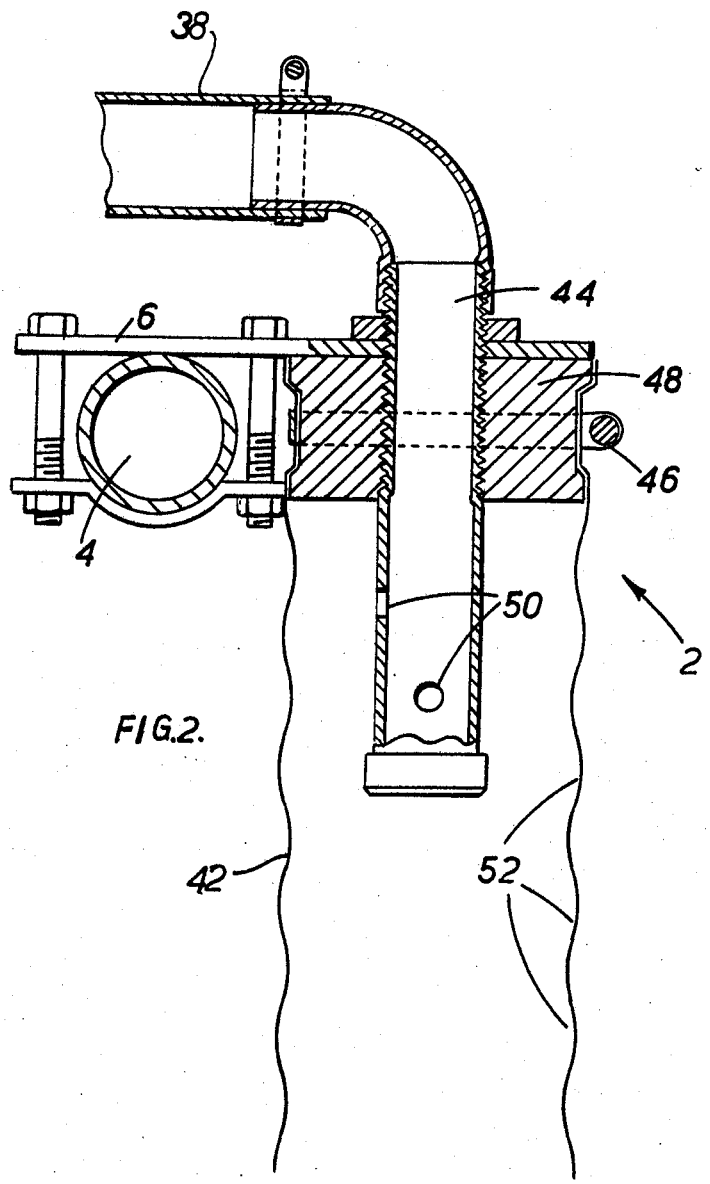
Figure 3:
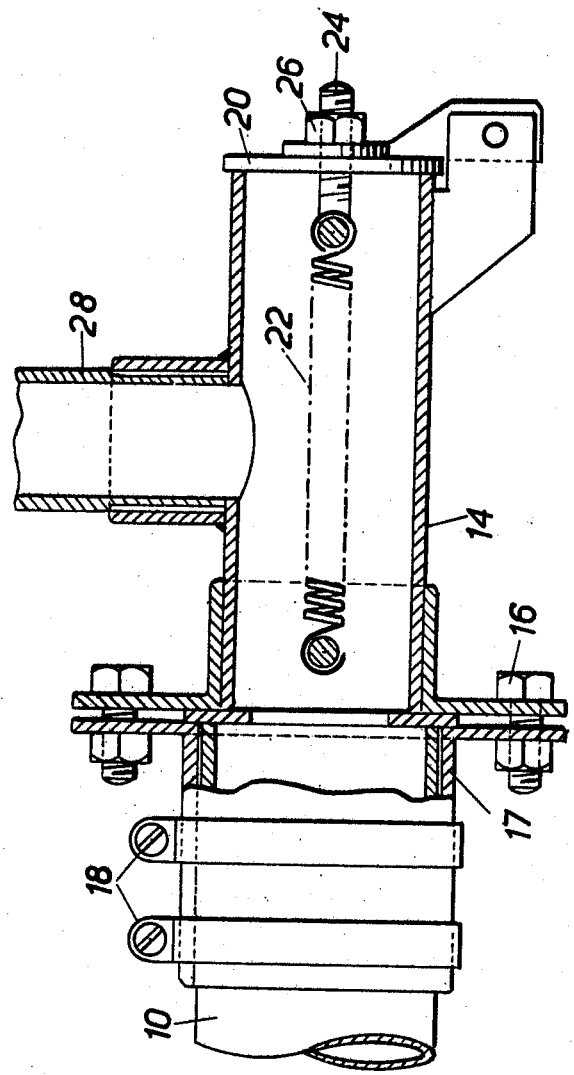
Figure 4:
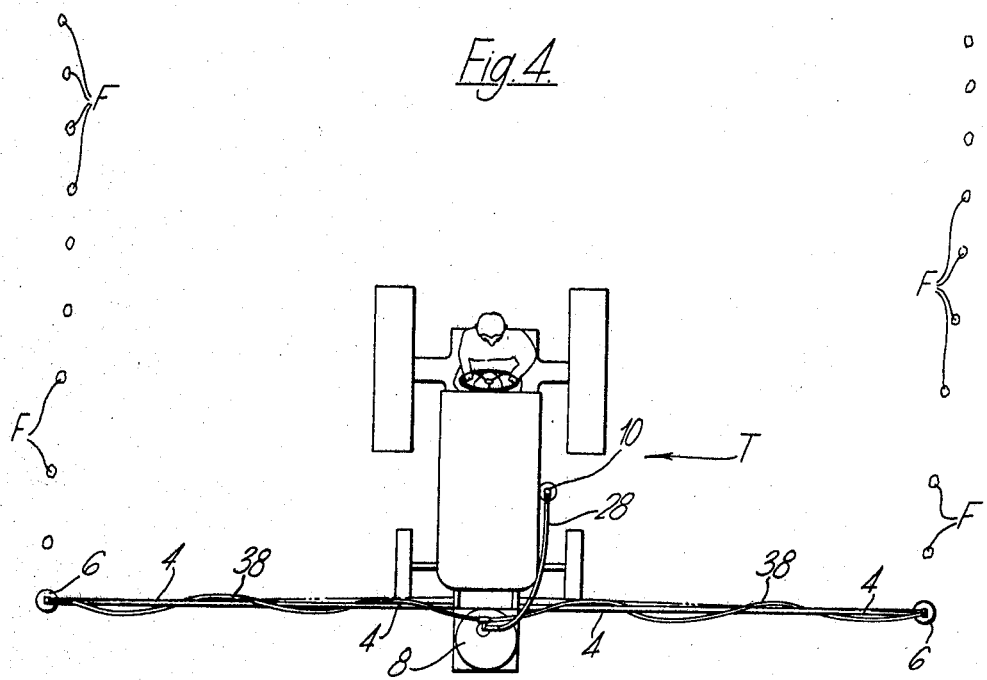

A preferred embodiment of the invention is described with reference to the accompanying drawings, in which:

FIGURES 1, 2 and 3 are vertical cross sections through different portions of the apparatus; and FIGURE 4 is a plan view of the apparatus mounted on an agricultural tractor equipped with a spray boom.

The apparatus may be mounted on a field car or a tractor carrying, for example, a spray boom or spreading device, or, again for example, on a spreading or spraying machine, and consists of discharge orifices 2 (FIGURE 2) mounted, in the example shown in FIGURE 4, above the ground at each lateral extremity of a spray boom 4 carried by a tractor T by means of clamps 6 (see FIGURE 2). Mounted at a convenient point on the vehicle or machine is a closed reservoir 8 (FIGURE 1) containing a detergent solution 9 or other agriculturally unobjectionable foamable liquid and capable of withstanding a working pressure equal to the maximum pressure of a pressurized gas source. As a source of compressed gas, we find that the exhaust from one engine of the vehicle on which the apparatus is mounted provides the most convenient source, gas at pressures ranging from 4–9 p.s.i. or even higher being available, according to the type and make of engine, without deleterious effects on the latter. If an air compressor is used as a source of gases, it may be convenient to use pressures up to 15 p.s.i.

According to the exhaust output of the engine, the exhaust pipe 10 (FIGURES 3 and 4) may be extended directly to the apparatus, or more usually indirectly via a relief valve which discharges excess gases when the desired working pressure is reached. The relief valve comprises a chamber body 14 secured by bolts 16 to an adaptor flange 17 fitted to the vehicle exhaust pipe 10 by clips 18, the opposite end of the chamber being normally closed by a flap valve 20 hinged to the body. This valve is held closed by a spring 22 secured at one end to the body and at the other end to a threaded extension 24 passing through the flap valve, a nut 26 on the extension being used to adjust the pressure within the chamber required to open the flap valve. An exhaust extension pipe 28 is connected to the chamber. This extension 28 of the exhaust pipe extends to the reservoir 8, via a control valve 30 operable to select the volume of gas discharged into the reservoir, and a non return valve 32 operative to prevent foam being discharged into the exhaust system of the vehicle should the engine of the latter stop for any reason.

The exhaust pipe extension terminates within the reservoir in an open ended down pipe 34 extending to the bottom of the reservoir, or in a similarly situated sparge or perforated rose. The open end of the pipe, the rose or the sparge must be situated beneath the minimum working level of liquid 9 within the reservoir. The resultant discharge of the gases through the liquid generates foam which fills the reservoir and overflows through an outlet 36 connected selectively by hoses 38 to the discharge orifices 2 by means of a three way valve 40. The discharge hose 38 is preferably of transparent PVC or other suitable synthetic plastic so that correct operation of the apparatus may be observed visually. The reservoir 8 is provided with a sight tube 54 and a filler opening 56 and cap 58.

The discharge orifices consist of a short length of pipe 42 of larger diameter than the discharge hose, secured so as to depend around a terminal fitting 44 on the discharge hose by means of a clip 46 clamping the pipe to a boss 48 carried by the clamp 6. The fitting 44 is threaded into this boss and has a capped lower end having openings such as perforations 50 in its wall.

The size of the pipe 42 relative to the discharge hose can be varied according to the type of mark required on the ground. With a larger discharge orifice, the pipe acts as a collecting vessel and produces intermittent but fairly large deposits of foam F: intermittency is assisted by providing convolutions 52 in the wall of the pipe so that the inside of the pipe is of vertically undulating form as shown in FIGURE 2. However, the arrangement of the apparatus in itself is found to give rise to a certain intermittency in foam production, which is of advantage in the present application.

By reducing the diameter of the pipe 42 a more continuous discharge of foam is obtained. Moreover, in certain applications, for example the spraying of standing crops, large deposits of foam may be lost by dropping down between the stems of the crop. In this case, the pipe 42 may be removed, in which case the perforations 50 in fitting 44 cause the foam to be spattered over the crop with resulting improved visibility.

It should be understood that it may be found convenient, instead of utilising exhaust gases to provide any other source of compressed air or other agriculturally unobjectionable gas for example compressed or liquefied gas in pressure containers, or an air compressor.

Whilst in the embodiment described, two discharge orifices 2 are provided, and the three way valve 40 enables foam to be supplied to either one or both, it may in some cases be possible to use only one orifice and to dispense with the valve 40. Moreover it may be convenient to indicate some other line parallel to the direction of motion of the vehicle other than a boundary of a bout, in order to facilitate alignment of the vehicle during a subsequent bout and if so the discharge orifice or orifices may be located accordingly.

It may be found that the clear indication given of the extent of the land treated by an agricultural operation by means of the present invention will enable productivity to be still further increased in that it may enable wider bouts to be treated at one time since there is now no difficulty in determining the boundary of such bouts. Moreover, the amount of liquid used for foam production is relatively small, and consequently it is found that a reservoir with an effective capacity of for example 5 gallons capacity will normally be sufficient for several hours operation without refilling: it should be noted that when filling the reservoir space must be left for foam formation. This extension of time between refills is a considerable advantage over the use of dye solutions, since in this latter case the quantity of solution used necessitates frequent refilling of the reservoir unles this is of very large capacity, and consequently also requires that the operator keep a frequent eye on the level of liquid in the reservoir.

What we claim is:

1. A method of indicating the lateral boundary of a bout treated by an agricultural vehicle, said method comprising providing a supply of foamable material on the vehicle, generating from said material on the vehicle an agriculturally unobjectionable foam and discharging said foam in at least one line parallel to the direction of motion of the vehicle whereby to provide a guide line for positioning the vehicle during an adjacent bout or subsequent operation.

2. A method according to claim 1 in which said material is a foamable liquid and said vehicle is driven by an engine, said method further comprising directing the exhaust gases of the engine to a discharge outlet beneath the level of the liquid in a reservoir on said vehicle, and conducting the foam thus generated to at least one discharge orifice.

3. Apparatus for defining the boundary of a swath treated by an agricultural vehicle comprising at least one discharge orifice carried by the vehicle and located so as to discharge on the ground; a reservoir containing a foamable liquid material of an agriculturally unobjectionable nature; an engine for driving said vehicle; an exhaust extension pipe connected to the exhaust system of said engine and terminating beneath the minimum working liquid level in said reservoir and thereby providing a source of presurrized gas for mixing with said liquid material to form a foam; and a tube connected to the top of said reservoir, which is otherwise closed, to conduct said foam to said discharge orifice, the reservoir, the gas source, the exhaust extension pipe and the tube all being carried by the vehicle.

4. Apparatus according to claim 3, wherein the discharge orifice comprises a depending fitting connected at its upper end to said tube and having openings below its upper end for discharging said material, and a depending pipe open at its bottom end and of greater cross section than said fitting, said fitting extending downwardly into said pipe and said pipe surrounding the lower end of said fitting, said pipe being closed at its upper end except for the extension of said fitting downwardly through said pipe upper end and into said pipe.

5. Apparatus according to claim 4 wherein said depending pipe is convoluted, the inside of said pipe being of vertically undulating form.

6. Apparatus according to claim 4, wherein the lower end of said fitting is perforated and the depending pipe is removable.

References Cited

UNITED STATES PATENTS

| | | | |
|---|---|---|---|
| 2,164,153 | 6/1939 | Friedrich | 169—15 X |
| 2,198,585 | 4/1940 | Urquhart et al. | 169—15 X |
| 2,199,421 | 5/1940 | Stevens | 111—25 |
| 2,491,380 | 12/1949 | Kutzler | 230—114 |
| 2,508,227 | 5/1950 | Clifford et al. | 169—15 X |
| 2,547,867 | 2/1951 | Judson | 222—178 |
| 2,770,912 | 11/1956 | Deem | 222—193 |
| 2,967,570 | 1/1961 | Nurkiewicz | 169—15 |
| 3,337,195 | 8/1967 | Farison | 169—15 |

SAMUEL F. COLEMAN, Primary Examiner

H. S. LANE, Assistant Examiner

U.S. Cl. X.R.

111—33; 169—15; 222—178